Feb. 21, 1956  R. A. LANGEVIN ET AL  2,736,006
ELECTRICAL POTENTIAL TABULATING DEVICE
Filed May 15, 1952  4 Sheets-Sheet 1

INVENTORS
ROBERT A. LANGEVIN
ARLING DIX BROWN JR.
CHARLES H. O'DONNELL
BY
ATTORNEY

Feb. 21, 1956 R. A. LANGEVIN ET AL 2,736,006
ELECTRICAL POTENTIAL TABULATING DEVICE
Filed May 15, 1952 4 Sheets-Sheet 2

FIG. 2

INVENTORS
ROBERT A. LANGEVIN
ARLING DIX BROWN JR.
CHARLES H. O'DONNELL
BY *Harry C. Page*
ATTORNEY Feb. 21, 1956 R. A. LANGEVIN ET AL 2,736,006
ELECTRICAL POTENTIAL TABULATING DEVICE
Filed May 15, 1952 4 Sheets-Sheet 3

FIG. 3

INVENTORS
ROBERT A. LANGEVIN
ARLING DIX BROWN JR.
CHARLES H. O DONNELL
BY *Harry C. Page*
ATTORNEY United States Patent Office 2,736,006
Patented Feb. 21, 1956

2,736,006

ELECTRICAL POTENTIAL TABULATING DEVICE

Robert A. Langevin, Glenburnie, Md., and Arling Dix Brown, Jr., Cleveland Heights, and Charles H. O'Donnell, Willowick, Ohio, assignors, by mesne assignments, to Clevite Corporation, Cleveland, Ohio, a corporation of Ohio Application May 15, 1952, Serial No. 288,082

8 Claims. (Cl. 340—183)

The present invention relates to a device for tabulating or listing electrical potentials and relates particularly to a device for tabulating a relatively large number of electrical potentials corresponding to individual electrical circuits and which are to be recorded at periodic intervals.

It is necessary, in many cases, periodically to read and tabulate a series of electrical potentials associated with different electrical circuits. Such potentials may be, for example, representative of the electrical resistance or capacitance of a series of devices being manufactured. In other cases, such potentials may represent another property of the material or device being manufactured or operated. Thus, it is frequently desired to obtain the variation of temperature of various parts of a large device or installation under certain conditions of operation. In such a case, thermocouples may be used to provide electrical potentials, each of which provides an indication of the temperature of the particular portion of the device with which the particular thermocouple is directly associated. In some cases, it is necessary to tabulate such data at rather short intervals and sometimes a chart or curve is provided which indicates continuously the value of each of the elements under consideration. However, in many cases, a tabulation of the actual numerical values is preferred. It has been, in many cases, the practice to record manually each of the values at periodic intervals. Inasmuch as such tests sometimes extend over a period of many weeks or even longer, this becomes a very laborious process. Also, since it is frequently desirable to continue such readings on a day-and-night basis and even over holidays, it frequently becomes difficult or expensive to provide the necessary personnel for carrying on such a test over a long interval of time.

In the cases where a tabulation of the actual numerical values is needed, it is frequently desirable to place the data relating to a number of different electrical circuits in a series of spaced rows and columns in which the data with reference to each electrical circuit appears in a symmetrical position so that the data for any particular circuit can be easily located. Furthermore, it sometimes becomes convenient to break up these rows into groups of, say, five or ten rows.

It is an object of the invention to produce a new and improved device for tabulating electrical potentials associated with a plurality of electrical circuits.

It is another object of the invention to provide a tabulating device of the type under consideration which is flexible as to the number of circuits with reference to which data may be recorded, which is flexible with reference to the accuracy with which the potentials are recorded, and which is flexible with reference to the type of tabulation which may be provided by the device.

It is another object of the invention to provide a device of the type under consideration which uses commercially available parts and which is rugged and dependable in operation and which is easily serviced.

In accordance with the invention, a device for periodically tabulating electrical potentials associated with a plurality of pairs of electrical terminals comprises a tabulating device and means for successively effectively connecting the tabulating device to the pairs of electrical terminals to tabulate the individual potential associated with each particular pair of electrical terminals during the interval the tabulating device is connected thereto. The device also includes a source of reference potential, a step-switch device for successively selecting progressively changing portions of the reference potential during the interval the tabulating device is effectively connected to each of the above mentioned pairs of terminals, and means for comparing each selected portion of the reference potential with the potential associated with the pair of terminals to which the tabulating device is effectively connected. Additionally, there are provided means responsive to the comparing means for developing a control signal when the selected portion of the reference potential and the potential associated with the one of the above-mentioned series of terminals to which the tabulating device is effectively connected are related within predetermined limits. Means are also provided which are dependent upon the timing of the above-mentioned control signal for causing the tabulating device to record an indication of the potential associated with the pair of the above-mentioned terminals to which the tabulating device is effectively connected.

For a better understanding of the present invention together with other and further objects thereof, reference is had to the following description taken in connection with the accompanying drawings and its scope will be pointed out in the appended claims.

Referring now to the drawings.

Figures 1, 4:
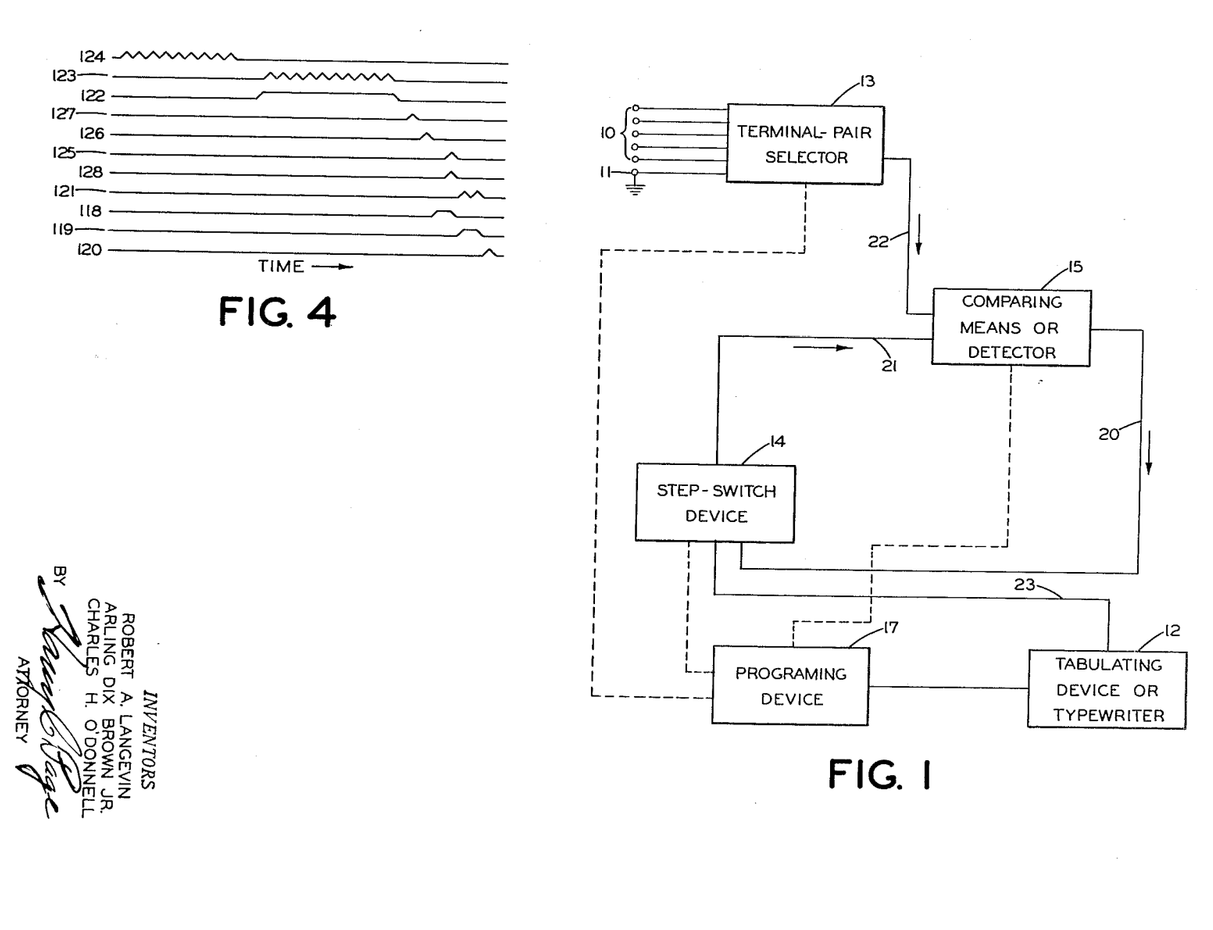
Fig. 1 is a block diagram which is used to explain the general principles of operation of the invention.
Fig. 4 contains a chart which is useful in explaining the operation of the embodiment of the invention illustrated in Figs. 2 and 3.

Reference is now made to Fig. 1 for a general description of one embodiment of the present invention. In Fig. 1 there is shown a device for periodically tabulating the electrical potentials associated with a plurality of pairs of terminals. Each of these pairs of terminals comprises one of the terminals designated by the reference numeral 10 and the terminal 11 which is grounded. The device of Fig. 1 also includes a tabulating device 12 which may, in some cases, take the form of a commercially available electric typewriter. The Fig. 1 arrangement also includes a terminal-pair selector 13 which is provided for successively effectively connecting the tabulating device 12 to the pairs of electrical terminals 10, 11 so that tabulating device 12 may tabulate the individual potential associated with each particular pair of electrical terminals 10, 11 during the interval the tabulating device 12 is connected thereto. A source of reference potential is through a step-switch device 14 and the step-switch device progressively selects portions of this reference potential during the interval the tabulating device 12 is effectively connected to each of the pairs of terminals 10, 11. A comparing means or detector 15 is provided for comparing each selected portion of the reference potential of device 14 with the potential associated with the pair of terminals 10, 11 to which the tabulating device 12 is effectively connected. When these compared potentials are related within predetermined limits, the device 15 develops a control signal. The arrangement of Fig. 1 also comprises means, including a programming device 17, which is dependent upon the timing of the control signal developed by detector 15 for causing the tabulating device 12 to record an indication of the potential associated with the pair of terminals 10, 11 to which the tabulating device 12 is effectively connected.

In a specific embodiment of the device, the terminals 10, 11 may represent a plurality of thermocouples which are to be read and tabulated at periodic intervals over a relatively long period of time. The terminal-pair selector 13 may be a step-switch which is used effectively to connect the output of a particular pair of the terminals 10, 11 to the tabulating device or typewriter 12. The connection from terminal-pair selector 13 to the tabulating device 12 is made through the comparing means 15 which provides a control signal, through the wire designated by the reference numeral 20, when the step-switch device 14 supplies a voltage over conductor 21 which is related within predetermined limits with the potential which is present at the terminal pair 10, 11 to which the terminal-pair selector 13 is connected. The completion of the connection of the terminal pairs 10, 11 with tabulating device 12 is made from the step-switch device 14 through the conductor 23.

In a preferred embodiment of the invention, the arrangement is such that one of the terminal pairs 10, 11 is selected by the selector 13 and connected to the comparing means 15, this connection being maintained for a predetermined interval of time. During this interval of time, the step-switch 14 selects progressively different reference potentials in a decade system and each of these selected potentials is supplied over the conductor 21 to the comparing means 15 where this potential is compared with the potential supplied over conductor 22 from one of the terminal pairs 10, 11. When it is found that a predetermined relationship exists between these compared potentials, a control signal is supplied over conductor 20 to the step-switch device 14 to cause it to stop in order to provide an indication of the potential which is supplied over conductor 21 at the time the required conditions exist. At the end of the above-mentioned predetermined interval, step-switch device 14 supplies, over conductor 23, to tabulating device 12 an indication of the numeral which should be typed or tabulated.

Also, in a preferred embodiment of the invention, one or more additional significant figures of the potential at the terminal pair selected are tabulated or typed. This is done by causing the step-switch device 14, after having made the comparison mentioned above, to compare a series of voltages of smaller steps to the potential of the terminal pair 10, 11 which is connected to comparing device 15, these smaller series of voltages steps representing the next significant figure to be tabulated. Actually, in the preferred embodiment of the invention under consideration the comparing device 15 is such that during the first comparison (which may be, for example, in a decade system of ten steps involving ten different voltages) the comparing device 15 provides a control signal only after a voltage step has been found by step-switch device 14 which represents a larger voltage than that supplied over conductor 22. In this case, the arrangement is such that tabulating device 12 does not record or tabulate the actual voltage provided by step-switch device 14 and found to exceed the desired voltage but actually types or records a number corresponding to a voltage which is one step lower than this value. Accordingly, when it is desired to provide an indication of the next significant figure, the voltage first recorded by the tabulating device 12 is added to the smaller voltage steps which are provided for the second comparison.

In this second comparison, the operation, in general, is the same as before. Thus, the voltages selected by step-switch device 14 are again supplied to comparing device 14 over conductor 21. These voltages are compared, with the potential supplied through terminal-pair selector 13 and conductor 22, in comparing means 15. Comparing means 15 again supplies a control signal at the time when a certain relationship exists between the compared voltages. This control signal is applied over conductor 20 to the step-switch device 14 and, at a predetermined time in the cycle, an indication of the voltage to be tabulated is supplied to tabulating device 12 over the path 23.

In order to cause the tabulations described above to be made in a predetermined sequence, a programming device 17 is provided. This programming device may take the form of a motor-driven cam or clock. Thus, for example, if the terminals 10, 11 are supplied with potentials from a plurality of thermocouples which are to be recorded hourly over a long period of time, the programming device 17 would comprise an arrangement for causing terminal-pair selector 13 to begin a selection of the terminal pairs 10, 11 hourly and to cause each of the terminal pairs 10, 11 in sequence to be connected in the manner described above to the tabulating device 12. Programming device 17 is also shown as connected by a dotted line to step-switch device 14 to indicate that the cycle of this step-switch is also under the control of programming device 17. A similar connection is provided between the programming device 17 and the comparing device 15. The significance of these connections will be more readily apparent from a consideration of the device which is described in detail hereinafter in connection with Figs. 2 and 3.

Figure 2:
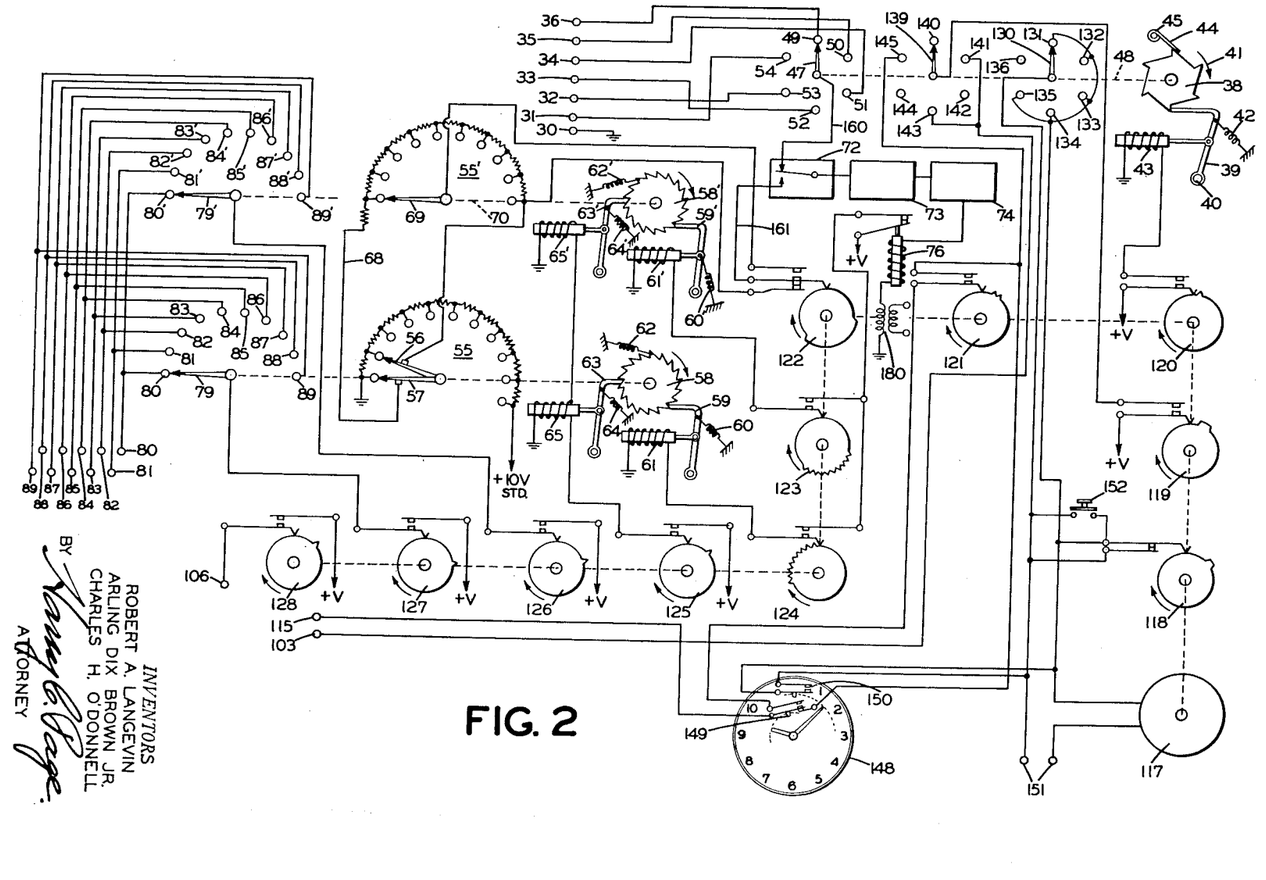
Figs. 2 and 3 together represent preferred embodiment of the invention.
Figure 3:
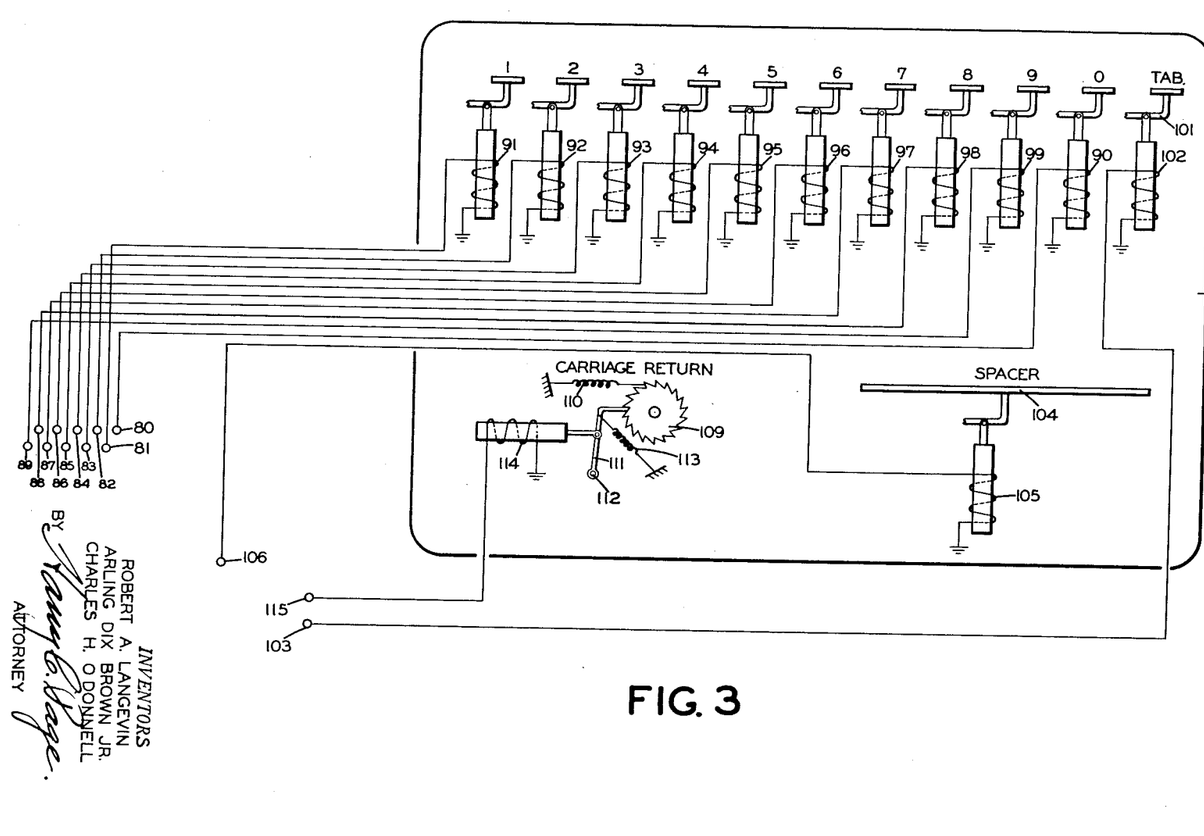

Reference is now made to Figs. 2 and 3 for a description of a specific embodiment of the device which has been described generally in connection with Fig. 1. The arrangement of Figs. 1 and 2 is also a device for periodically tabulating electrical potentials associated with a plurality of pairs of electrical terminals. Here the electrical terminals comprise the grounded terminal 30 (Fig. 2) and the terminals 31 to 36, inclusive, and the device also includes a tabulating device which is indicated generally by the reference numeral 37 (Fig. 3). This embodiment also includes a means for effectively connecting the tabulating device 37 to pairs of electrical terminals comprising the grounded terminal 30 and one of terminals 31 to 36, inclusive, in order to tabulate the individual potential associated with each particular pair of electrical terminals during the interval the tabulating device 37 is connected thereto. The terminal-pair selector just mentioned comprises a toothed wheel 38 (Fig. 2) having protrusions thereon adapted to be contacted by a lever 39, pivoted at a point 40, in order to cause the toothed wheel 38 to be moved in steps in the direction indicated by the arrow 41. The lever 39 is normally spring-biased, by means of a spring 42, away from the teeth of the wheel 38 but is adapted to be pulled into contact with the teeth by means of a magnetic solenoid having a coil 43. A leaf spring 44, pivoted at point 45, is provided in order to prevent counterclockwise motion of the toothed wheel 38. Toothed wheel 38 is caused to drive the rotation arm 47 of a selector switch, as indicated by the dotted connection 48. The arm 47 is also driven in a clockwise direction and makes contacts with a plurality of stationary switch points 49, 50, 51, 52, 53, and 54.

In order to provide a source of potential for a comparison with the potential selected by arm 47, there is provided a voltage divider, designated generally by the reference numeral 55, and connected across a source indicated as "+10 V. STD." to indicate that it is a standard voltage source of 10 volts, one terminal of the voltage divider being grounded as shown. The voltage divider comprises a series of ten resistors of equal value having taps brought out which can be contacted by movable contact arms 56 and 57 of the step-switch device. The arms 56 and 57 are insulated from each other for a reason which will be pointed out more fully hereinafter. The arms 56 and 57 are both driven by a toothed wheel 58, adapted to be stepped to various positions by means of a lever 59 which is spring-biased away from the toothed wheel 58 by a spring 60. The lever 59 is caused to contact the teeth of the wheel 58 when a solenoid 61 is energized, pulling the lever 59 against one of the teeth of the wheel to cause the wheel to be moved one step in a clockwise direction. The wheel 58 is spring-biased in a counterclockwise direction by means of a spring 62. The wheel is normally held in any position where it is set by means of the lever 59 by means of another lever 63, held in contact with the wheel 58 by means of a spring 64. However, a solenoid 65 is provided which, when energized, causes lever 63 to be removed from contact with the toothed wheel 58. Under these conditions, the spring 62 is adapted to return the toothed wheel 58 to its initial position, corresponding to the position illustrated in the drawing.

The step-switch device of Fig. 2 also includes an additional section which again comprises a voltage divider generally similar to that designated by the reference numeral 55. This additional voltage divider is indicated in Fig. 2 by the reference numeral 55'. The voltage divider 55' also comprises a resistor having taps brought out to provide ten divisions. However, in this case, the voltage divider 55' is adapted to have connected thereacross the voltage which has previously been selected by the voltage divider 55 in a manner which will be described more fully hereinafter. For this reason, therefore, one end of voltage divider 55' is connected through a conductor 68 to the movable contact arm 57 of switch 55. The other end of voltage divider 55' is connected to the arm 56 of voltage divider 55. The voltage divider 55' also comprises a movable arm 69 which is driven, as indicated by the dotted line 70, by a toothed wheel designated by the reference numeral 58'. The operating elements associated with toothed wheel 58' are generally similar to those associated with the toothed wheel 58' and bear identical reference numerals primed.

The voltages which are selected by the potential dividers 55 and 55' are compared with the voltage selected by rotating switch arm 47 from the terminal pairs including terminal 30 and one of the conductors 31 to 36, inclusive. This comparison is made in a device which includes a chopper 72, an amplifier 73, and a thyratron 74, the output of which is supplied to a solenoid 76.

Associated with the potentiometer device 55, and mechanically driven therewith by the toothed wheel 58, as indicated by the dotted line, is an additional movable switch contact 79. Associated with the movable contact 79 are a series of stationary contacts 80 to 89 inclusive which are carried out to terminals which bear corresponding reference numerals. Similarly, there is associated with voltage divider 55' an additional rotatable contact arm similar to arm 79 and designated by the reference numeral 79'. The stationary switch contacts with which arm 79' cooperates are similar to those designated by the reference numerals 80 to 89 and accordingly are designated by similar reference numerals primed.

Specific reference is now made to Fig. 3 wherein there is shown in some detail the tabulating device 37. This tabulating device is illustrated as having a plurality of keys corresponding to the numerical keys of a typewriter. It will be understood that the device is such that when any designated key is pressed, a number will be printed in a manner similar to that of a typewriter action. There is associated with each of the keys a solenoid-operated device which, when energized, will also operate the key with which it is associated. Thus, associated with the key for printing the numeral one, there is provided a solenoid 91, one end of which is grounded and the other end of which is connected to a terminal 81 to indicate that terminal 81 of Fig. 3 is connected to the terminal 81 of Fig. 2. Similarly, the other solenoid coils of the Fig. 3 illustration are correspondingly numbered to correspond with the terminals of Fig. 2 to which they are connected. Thus, the zero key of the tabulating device of Fig. 3 is operated by a solenoid designated by the reference numeral 90 and having one end connected to the terminal designated by the reference numeral 80.

In order to provide a spacing arrangement corresponding to the tabulating key of an electric typewriter, for example, there is provided a tabulating key in Fig. 3 designated by the reference numeral 101. This tabulating key is adapted to be operated by a magnetic solenoid having a coil 102, one end of which is grounded and the other end of which is brought out to a terminal designated by the reference numeral 103. Similarly, a bar which performs the function performed by the spacer bar of an ordinary electric typewriter is illustrated by the reference numeral 104. The bar 104 can be electrically operated by means of a solenoid having a coil designated by the reference numeral 105 and having one end grounded and the other end brought out to a terminal designated by the reference numeral 106. In order to provide an action for the tabulating device of Fig. 3 which corresponds to the carriage return on an ordinary electric typewriter, a toothed wheel 109 is provided which is carried by the platen of the tabulating device. This toothed wheel is normally biased to its original position by means of a spring 110 but is normally prevented from returning to this position and caused to retain the position which is established by a printing operation by the action of a lever 111 which is pivoted at point 112 and spring-biased against the toothed wheel by means of a spring 113. An electrical solenoid having a winding 114 is provided for removing the lever 111 from contact with the toothed wheel 109 to allow the spring 110 to return the toothed wheel 109 to its original and normal position. One end of the winding 114 is grounded and the other end is brought out to a terminal designated by the reference numeral 115.

Returning now to Fig. 2, there is provided a programming device for the arrangement shown which comprises a motor 117 which is adapted to drive a number of cams 118 to 128 inclusive, as indicated by the dotted connection between the cams and the motor. Each of these cams is adapted to open or close, in a predetermined sequence, an electric switch with which it is associated. Thus the cam 118 is provided primarily for the purpose of interrupting the tabulating cycle at the end of a series of operations. The cam 119 is provided for providing an operating of the tabulating key or of the carriage return of Fig. 3 at a proper part of the operating cycle. Cam 120 is provided to energize coil 43 at the proper place in the operating cycle. This has the effect of moving the toothed wheel 38 which in turn moves the movable contact 47 to select various ones of the terminal pairs including the terminal 30 and one of the other terminals 31 to 36, inclusive. At this point it can be mentioned that two additional switch sections are associated with the toothed wheel 38. Thus the toothed wheel 38 drives a rotatable switch contact 130 with which is associated a series of stationary contacts 131, 132, 133, 134, 135, and 136, inclusive. The toothed wheel 38 also drives a rotatable switch contact 139 with which is associated a series of stationary contacts 140, 141, 142, 143, 144, and 145, inclusive. The cam 121 is provided primarily for providing carriage return at the proper place in the operating cycle. The cam 122 is provided for supplying either the voltage output selected by the voltage divider 55 or that selected by the voltage divider 55' to the chopper 72 at the proper points in the operating cycle. The cam 123 is provided for the purpose of energizing solenoid 61' in order to notch the wheel 58' and thereby move the rotating contact arm 69 of voltage divider 55' at the proper places in the operating cycle. The cam 124 is provided in order to energize solenoid 61 and thereby notch toothed wheel 58 which in turn moves at the proper places in the operating cycle. The cam 125 is provided for the purpose of energizing solenoids 65 and 65' at the proper place in the operating cycle and thereby release toothed wheels 58 and 58' so that they may be returned to their respective initial positions by the action of the respective springs 62 and 62'. The cam 126 is provided for the purpose of causing tabulating device 37 to indicate, at the proper point in the operating cycle, a numeral corresponding to the voltage selected by voltage divider 55'. Cam 127 is provided for similarly causing tabulating device 37 to record, at the proper point in the operating cycle, the voltage selected by voltage divider 55'. The cam 128 is provided for the purpose of energizing solenoid 105 to operate the spacer device of the tabulator 37 at the proper place in the operating cycle.

The programming arrangement of the device under consideration also includes a time clock 148 which has a switch device 149 adapted to be operated by the hour hand of the clock and a switch device 150 adapted to be operated by the minute hand of the clock. A source of operating voltage may be supplied to the motor 117 through a pair of terminals designated by reference numeral 151 and a starting switch 152 is provided for motor 117. The connections of the various electrical devices not specifically described in detail above are as shown in the various figures of the drawing.

Reference is made to Fig. 4, in which is shown a chart which indicates the portion of the operating cycle during which each of the respective cams mentioned above is closed. Thus the numeral 124 in the chart of Fig. 4 indicates the operation associated with cam 124 of Fig. 2. It will be seen that cam 124 is opened and closed a number of times during the first part of the operating cycle which is represented by the chart of Fig. 4. A detailed explanation of the sequence of operation of the various cams is given hereinafter in connection with the detailed description of the operation of the device of Figs. 2 and 3.

Figure 5:
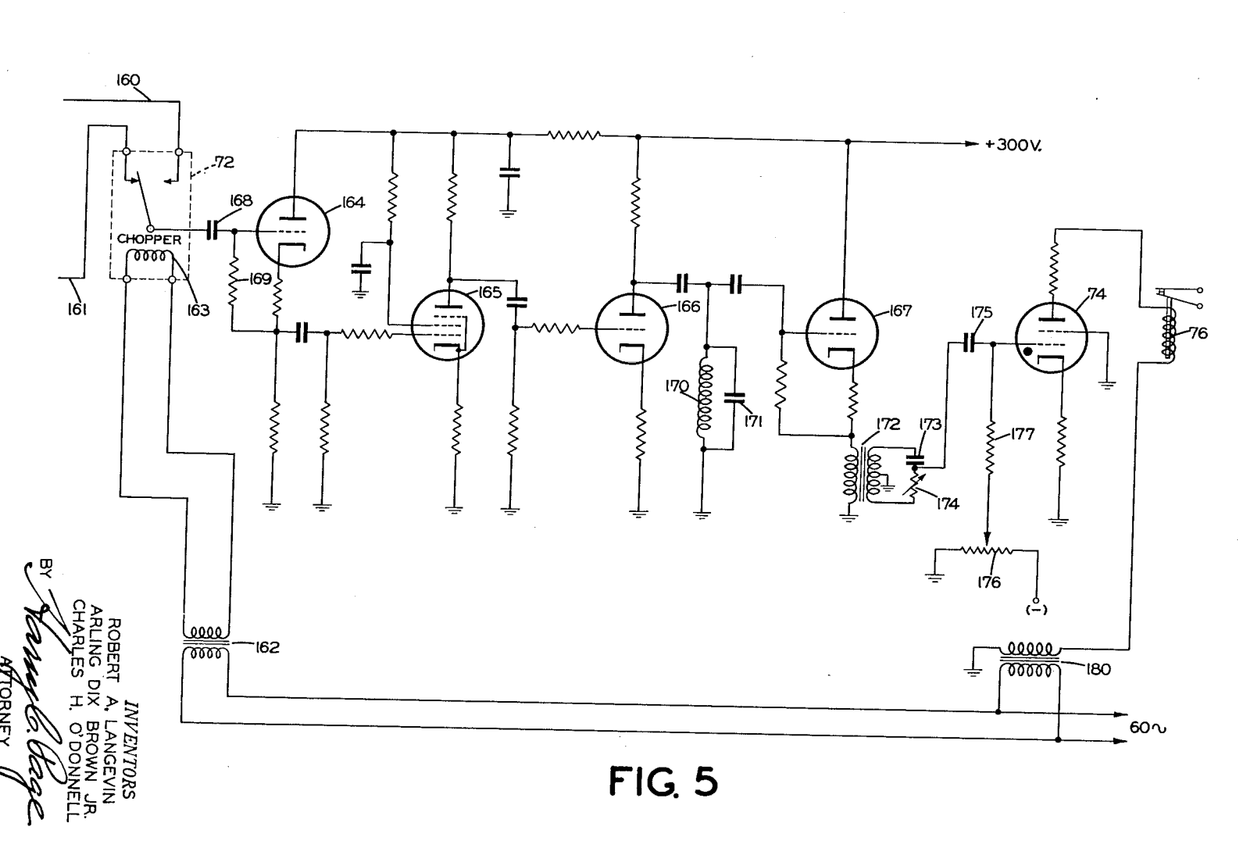
Fig. 5 shows in more detail certain components of the apparatus illustrated in Fig. 2.

In Fig. 5 are illustrated, in some detail, certain portions of the apparatus which is shown in block form in Fig. 2. Elements of Fig. 5 which are similar to those of Fig. 2 bear identical reference numerals. Thus the chopper 72 of Fig. 2 is illustrated at the left hand portion of Fig. 5 and comprises a single-pole double-throw switch, to one pole of which is connected a conductor 160 and to the other pole of which is connected a conductor 161. The chopper is actuated from a suitable source of operating potential, indicated as 60 cycles in the illustration of Fig. 5. A transformer 162 is included between the 60 cycle power source and the operating solenoid 163 of the chopper 72. Connected to the output circuit of the chopper 72 is an amplifier circuit which includes tubes 164, 165, 166, and 167. A coupling condenser 168 and grid leak resistor 169 serve to couple the output of chopper 72 to the tube 164. The remaining portions of the four stage amplifier including tubes 164, 165, 166, and 167 are conventional and require no further description in detail, except that tube 166 includes in its output circuit a tuned circuit including an inductance 170 and a capacitance 171, this tuned circuit being resonant at the frequency of the power source which energizes the chopper 72; namely, in the case shown, at a frequency of 60 cycles per second. A gas-filled or thyratron tube 74 has its input circuit coupled to the cathode circuit of tube 167 through a phase-control circuit which includes a transformer 172 having a secondary winding with a mid-tap which is grounded. Connected in series with the secondary winding of transformer 172 is a condenser 173 and a variable resistor 174, the grid of thyratron 74 being connected to the point of the circuit which is common to the condenser 173 and the resistor 174 through a coupling condenser 175. A negative bias is provided for thyratron 74 by means of a voltage divider 176 having an adjustable contact point which is coupled through a resistor 177 to the grid of thyratron 74. The output electrodes of thyratron 74 are connected to the winding 76 of a relay having normally closed contacts. The circuit connections of the contacts associated with winding 76 are illustrated in detail in Fig. 2. Also, as illustrated in Fig. 2 and as shown in detail in Fig. 5, a transformer 180 is provided which has one winding in series with winding 76 of the relay operated by the thyratron tube 74. The other winding of the transformer 180 is connected to the source of alternating potential which drives the chopper 72 through the transformer 162. The purpose of transformer 180 will be described in more detail in connection with the detailed description given hereinafter in connection with the embodiment of the invention which has been described.

For a detailed description of the operation of the device which has just been described, reference is first made to Fig. 2. From a consideration of Fig. 2, it will be seen that the motor 117 serves, when energized, to drive the cams 118 to 128, inclusive, through a predetermined cycle. For the reason that it appears to be somewhat easier to describe this operating cycle by starting at a point in the operating cycle where cam 124 becomes effective, the cams of Fig. 2 have been shown in a position where motor 117 has been running for some time. However, before picking up this phase of the description of operation, the method of initially starting the system will first be considered.

It will seen that, during one part in the operating cycle of cam 118, the cam is effective to open the contacts of the switch associated with it and that, assuming that the movable switch point 130 is on the stationary contact 136 of the switch in the upper part of the figure, no energy is supplied from the terminals 151 to the motor 117. It will be seen, however, that power is supplied to the motor 117 when switch 150 of the clock device 148 is closed and switch 150 is thus the starting switch for the system. As soon as switch 150 is closed, motor 117 is energized and begins to drive the cams 118 to 128, inclusive, and it will be seen from an inspection of cam 118 that, after only a very short interval, the switch associated with cam 118 is closed, thereby effectively locking the motor 117 to its source of power supply terminals 151 until one complete revolution of cam 118 has been effected and the switch associated with cam 118 has again been opened. This, of course, effectively stops the motor 117 only when it occurs at a time when rotating switch point 130 is on stationary switch point 136 of the rotatable switch in the upper portion of the figure as mentioned above. It will be understood that the switch 150 of the clock device 148 is closed for only the short interval of time which is necessary to allow the switch associated with cam 118 to close.

As also mentioned above, the positions of the various elements in Fig. 2 have been illustrated to correspond with the portion of the operating cycle at which cam 124 is about to become effective and, accordingly, the detailed description of the operation of the device will be given on this basis. Under the described conditions, the motor 117 is, of course, energized and all of the cams 118 to 128 are rotating. It will be seen from Fig. 4 that, during the first portion of this operating cycle, cam 124 is effective to supply a series of voltage pulses to the operating solenoid 61 which drives the toothed wheel 58. Thus a pulse is supplied each time the switch associated with cam 124 is closed, the circuit to solenoid 61 being completed to a source of voltage supply +V through the normally closed contacts operated by solenoid 76. Each of the pulses supplied to solenoid 61 by the operation of the cam 124, as described, is effective to move the toothed wheel 58 one position in the manner which has previously been described. The toothed wheel 58 drives the rotating contacts 56 and 57 of voltage divider 55, thus selectively to provide progressively changing portions of the reference potential which is supplied by the source marked "+ 10 V. STD." Each of these selected potentials is, of course, in turn supplied to the chopper 72 through the closed contacts associated with cam 122 and the conductor 161. In the position illustrated in the drawing, it will be seen that rotating switch point 47 effectively couples terminal 36 to the other pole of chopper 72 through the conductor 160. Thus, during the interval when rotating switch point 56 of voltage divider 55 is on the second stationary switch point as illustrated in the drawing, the smallest voltage supplied by the ten volt standard source (or one volt in the decade system under consideration) is applied to one pole of the chopper 72 and the potential which is present between terminals 36 and 30 is applied to the other pole of chopper 72. Referring to Fig. 5, it will be seen that, under these conditions, first one and then the other of these voltages are applied to the input circuit of tube 164 when the chopper 72 is operating. It should, of course, be mentioned that the chopper 72 is arranged to operate synchronously with the alternating voltage supplied to coil 163, one polarity of this voltage being effective to connect conductor 160 to the input circuit of tube 164 and the other polarity of the voltage supplied to the solenoid 163 being effective to connect conductor 161 to the input circuit of tube 164. The remaining portion of the circuit of Fig. 5 is such as to cause thyratron tube 74 to become conductive only when the voltage supplied over conductor 161 exceeds that supplied over conductor 160. In order to accomplish this result, the windings of the transformer 180 are so phased that a negative voltage is connected to the anode of thyratron 74 during the interval when conductor 160 is connected to the input circuit to tube 164 by chopper 72. Thus, during this interval, it is impossible for tube 74 to become conductive. During the interval when conductor 161 is connected to the input circuit of tube 164 by the chopper 72, it is possible for tube 74 to become conductive inasmuch as its anode voltage is positive during this interval but it does not, of course, become conductive so long as its grid voltage is negative. The circuit constants are such that the charge or condenser 168 which has been supplied thereto over conductor 160 prevents tube 74 from becoming conductive even though a positive voltage is applied to its anode if the voltage present on conductor 160 exceeds that present on conductor 161. However, circuit constants are such that, whenever the voltage supplied over conductor 161 exceeds that supplied over conductor 160, the charge on condenser 168 changes in such a manner that tube 74 becomes conductive when a positive potential is applied to its anode. As has been pointed out previously, the phase of the anode potential supplied to tube 74 effectively prevents it from becoming conductive except during the interval when conductor 161 is connected to the input circuit of tube 164 by the chopper 72.

Referring again to Fig. 2, it will be seen, therefore, that winding 76 is not energized due to the operation of thyratron tube 74 until such time as the voltage which is supplied from voltage divider 55 to conductor 161 exceeds the voltage which is supplied to conductor 160 from the terminal 36. However, as cam 124 continues to cause toothed wheel 58 to be driven in a clockwise direction, the rotating contact 56 of voltage divider 55 eventually finds such a position as to cause thyratron 74 to be operative and thereby open the contacts associated with solenoid 76. This effectively opens the power-supply circuit for solenoid 61 so that the position of the rotating contacts 56 and 57 of voltage divider 55 is no longer changed, even though the cam 124 continues to operate and even though the contacts associated with this cam may be thereafter opened or closed an additional number of times during the cycle. It will be seen, therefore, that the position at which the rotating contacts 56 and 57 of voltage divider 55 stop provides an indication of the voltage present at terminal 36. Specifically, the control voltage, which opens the contacts associated with solenoid 76, is provided when the potential associated with the one of the pairs of terminals being investigated, specifically terminals 36 and 30 to which the tabulating device 37 (Fig. 3) is effectively connected, and the selected portion of the reference potential supplied to conductor 161 from voltage divider 55 are related within predetermined limits. Actually these conditions are that the voltage derived from voltage divider 55 must be greater than that present at terminal 36. However, the conditions are such that the voltage supplied by voltage divider 55 cannot exceed the voltage present at terminal 36 by a value greater than that provided by one of the successive steps of voltage divider 55 when the control voltage is provided by thyratron 74.

Referring now again to Fig. 4, it will be seen that cam 123 is effective during the next portion of the operating cycle and that, by the operation of cam 123, the normally open contacts associated with this cam are closed and opened a number of times. Also, by reference to Fig. 4, it will be seen that during the interval in which these contacts are being periodically closed and opened, the cam 122 is effective to open the lower set of contacts associated with it and to close the upper pair of contacts associated with it. The closing of the upper pair of contacts of cam 122 has the effect of connecting conductor 161, supplying one pole of the double-throw-switch of chopper 72, to the rotating switch point 69 of voltage divider 55'. It will be seen that the periodic closing and opening of the contacts associated with cam 123 are effective periodically to energize solenoid 61' which drives toothed wheel 58'. It will be understood that the driving arrangement for the toothed wheel 58' is generally similar to that which drives the toothed wheel 58 and the operation will not be again described in detail. The energizing circuit for solenoid 61' is through the contacts associated with cam 123 and the normally closed contacts of solenoid 76 to the source of voltage indicated as +V. It will be understood that thyratron 74 has previously been caused to revert to a non-conductive condition by the opening of the lower set of contacts associated with cam 122. Under the conditions described, it will be seen that the voltage applied to chopper 72 over conductor 161 is that supplied by the voltage divider 55' plus that supplied by the voltage divider 55 through the rotating switch point 57. As previously mentioned and under the assumed conditions, this necessarily results in a condition in which the voltage supplied over conductor 160 exceeds that supplied over conductor 161. The thyratron 74 therefore becomes non-conductive as soon as its anode voltage becomes negative and remains in the non-conductive condition in spite of further alternations of the polarity of its anode for so long a time as the assumed conditions exist.

Assume now, for the moment, that the operation of voltage divider 55 which was described above resulted in causing rotating switch point 57 to be stopped on the third stationary switch point of voltage divider 55. Thus, under these conditions, the potential associated with two of the resistor sections of voltage divider 55 plus the potential supplied through rotating switch point 69 of voltage divider 55' is supplied to conductor 161. The illustrated arrangement, therefore, is such that the rotating switch point 69 again tends to supply increasingly higher voltages to conductor 161. This program proceeds until the voltage supplied to conductor 161 again exceeds that supplied from terminal 36 to conductor 160 in the manner described above. It will be seen that the voltage supplied from rotating switch point 57 of voltage divider 55 is less than that supplied from rotating switch point 56 by one of the voltage steps of voltage divider 55. Voltage divider 55 is preferably made to correspond with a decade system and may, for example, provide comparison voltages over a range of ten volts in steps of one volt. Similarly, voltage divider 55' is preferably caused to provide an indication of the second significant figure in a decade system and, under the conditions assumed, would provide a total voltage change of one volt in steps of one-tenth volt. The notching of relay 58' continues as stated above until the voltage provided for comparison purposes again exceeds that of potential 36. Under these conditions, the thyratron 74 energizes the winding 76 which opens the contacts associated with it thereby to open the circuit through which the contacts of cam 123 supply voltage pulses to solenoid 61'. Under these conditions, the rotation of arm 69 of voltage divider 55' stops as soon as a position has been found which provides a voltage which exceeds by one voltage step of voltage divider 55' that present at terminal 36.

It will be assumed, for the purpose of this description, that rotating switch arm 57 of voltage divider 55 was effectively stopped, as described above, on the third stationary contact point of voltage divider 55. Furthermore, it will be assumed that the rotating switch point 69 of voltage divider 55' is caused to stop, in the manner which has been described above, on the fifth stationary contact of potential divider 55'. A reference to Fig. 4 will disclose that, during the next part of the operating cycle, the contacts associated with cam 127 are caused to operate. This has the effect of closing the contacts associated with cam 127 and effectively connects a voltage pulse from the source indicated as +V through the contact arm 79 to the terminal designated by the reference numeral 82 for the reason that rotating switch arm 79, also in the manner described above, has been rotated simultaneously with the rotating switch point 57. This pulse to terminal 82 supplies a voltage pulse to the solenoid 92 (Fig. 3), resulting in the tabulating device typing the numeral 2. The reason that the numeral 2 is tabulated is that the voltage balance found by the operation of voltage divider 55 as described above was determined to be, under the conditions assumed, between two and three volts.

Again, by reference to Fig. 4, it will be seen that, during the next portion of the operating cycle, cam 126 is caused to operate, thus effectively closing a circuit through the contacts associated with cam 126 from the voltage source indicated +V to the rotating switch point 79'. Rotating switch point 79' is now under the conditions assumed effectively connected with stationary contact 84' for the reason that rotating switch point 69 moves mechanically with rotating switch point 57. The voltage pulse which is supplied to stationary switch point 84' is effective to energize solenoid 94 (Fig. 3). This causes the tabulating device to tabulate the number four. As so far described, therefore, the voltage which is present at terminal 36, or more properly between terminal 36 and ground, has been investigated first by the operation of voltage divider 55 and thereafter by the operation of voltage divider 55' and tabulating device 37 has been caused to record an indication of the voltage found; namely, a value of 2.4 volts.

A reference to Fig. 4 will show that the contacts associated with cam 118 are opened during the next portion of the operating cycle. This would normally have the effect of de-energizing the motor 117. However, it will be seen that the motor is now energized from the source 151 through the rotating switch point 130 and stationary switch contact 131. Thus, at this portion of the cycle, the operation of cam 118 is ineffective to influence the operation of the device.

It will also be seen that, by a reference to the chart of Fig. 4, during the next portion of the operating cycle, cams 125 and 128 are effective. Cam 125 is effective to close the switch contacts associated with it and, therefore, to couple a voltage from the source indicated +V to each of the solenoids 65 and 65'. The energization of solenoids 65 and 65' effectively re-sets the toothed wheels 58 and 58' to their initial position. Thus, with reference to solenoid 65, the lever 63 is removed from engagement with the toothed wheel 58 and the spring 62 is effective to return the toothed wheel 58 to its initial position. A similar operation causes toothed wheel 58' to return to its initial position. The closing of the contacts associated with cam 128 cause a voltage to be supplied over conductor 106 to solenoid 105 (Fig. 3) which causes the tabulating device to space. Tabulating device 37, as stated above, may be a commercially available electric typewriter and, in such case, the energization of solenoid 105 has the same effect as the operation of the spacer bar on the typewriter.

Cam 121 is effective during the next portion of the operating cycle. This cam is provided in order to energize the carriage-return solenoid 114 of tabulating device 37 (Fig. 3) under certain operating conditions. The carriage return solenoid 114, when operated, is energized through the conductor 115, the switch 149 associated with the hour hand of clock 148, and the contacts associated with cam 121. However, under the conditions assumed and as illustrated in the drawing, this circuit is open at the stationary contact terminal 140 and therefore cam 121 is ineffective at this portion of the operating cycle.

Cam 119 also operates simultaneously with cam 121, as will be apparent from a reference to the chart of Fig. 4. However, under the assumed conditions, the cam 119 is ineffective at this part of the operating cycle for the reason that the circuit associated with the contacts driven by cam 119 is open at the stationary switch contact 140 with which rotating switch contact arm 139 is associated.

At the next part of the operating cycle, as will be seen by a reference to Fig. 4, the cam 120 is effective. The operation of cam 120 causes a voltage to be supplied from the source indicated +V to the solenoid 43. The energization of solenoid 43 causes toothed wheel 38 to be driven one step in a clockwise direction as previously described. This causes rotating switch points 47, 139, and 130 to be moved one step in a clockwise direction. Thus rotating switch point 47 is moved to contact 50 which has the effect of connecting terminal 35 to the conductor 160 which supplies a voltage to be investigated and tabulated to chopper 72. Rotating switch point 139 is thus moved to stationary switch point 141. Similarly, rotating switch point 130 is thus moved to switch point 132.

The above thus completes a description of one complete revolution of the operation of the various cams under the conditions assumed. The motor 117, however, continues to be energized and the cams are again driven through another revolution. In this case, a voltage from voltage divider 55 is again compared, by the action of the chopper 72 and the thyratron 74, with the voltage present at terminal 35. This comparison continues until the rotating switch arm 56 of voltage divider 55 is stopped at a point corresponding to a step voltage which is one step higher than that supplied by terminal 35. Also, the potential divider 55' operates as before to provide an indication of the second significant figure of the voltage associated with terminal 35. The operation in this case again is similar to that which has been described and will not be repeated in detail. The operation in this case differs, however, due to the fact that tabulator solenoid 102 (Fig. 3) is effectively connected over conductor 103 to the switch point 141 with which rotating switch contact 139 is associated. Thus at the point during the operating cycle where the cam 119 is effective to close the contacts associated with it, a voltage is supplied which is effective to energize the solenoid 102 of the tabulating key of the tabulator or typewriter 37. It will be seen that the operation of this tabulator key comes after the voltages which have been found by voltage dividers 55 and 55' have been tabulated in the manner previously described. Thus, as so far described, the tabulating device has tabulated or recorded the figure 24 to indicate the voltage associated with the terminal 36 and has tabulated another figure, for example 45, to indicate the voltage which is associated with the terminal 35 and it is only after this much of the operation has been completed that the tabulating key of the typewriter is energized. Except for the described function of cam 119 in providing a tabulating action when the switch points 139, 141 are closed, the second cam cycle is thus similar with the first cam cycle.

In considering the operation of the tabulating device of the invention in connection with the third revolution of cams 118 to 128, inclusive, it will be seen that in this case the rotating switch points 47, 139, and 130 have been moved to the third position. Thus switch points 47, 51 are closed; switch points 139, 142 are closed and switch points 130 and 133 are closed. It will furthermore be seen from an inspection of the arrangement of Fig. 2 that the program during the third revolution of the cams is identical to that of the first revolution. Thus there is no connection to stationary switch point 142 and this corresponds to the fact that there is no connection to the switch point 140. Therefore, during the third revolution of the cams, the voltage at terminal 34 is investigated and two significant figures giving the value of this voltage are tabulated in the manner which has already been described in detail above.

In considering the fourth revolution of the cams, it will be seen that the operation of the system is identical to that described in connection with the second revolution of the cams. It will thus be noted that a tabulation is made by the energization of tabulator solenoid 102 (Fig. 3) during the fourth revolution of the cams of Fig. 2. The programming during the fifth revolution of the cams again corresponds to that which was obtained during the first revolution of the cams. In this case it is the potential on contact 32 which is being investigated.

During the sixth revolution of the cams, the switch contacts 47, 54 are closed. Correspondingly switch contacts 139, 145 are closed. This results in the energization of the carriage return of the tabulating device 37 (Fig. 3) when the contacts associated with cam 121 are closed. It will be seen, however, that before this carriage return takes place, the contacts associated with cam 118 are opened, thus causing the motor 117 to be stopped due to the fact that there is no connection to switch point 136 and the circuit is opened at the switch contact points 136, 130. It will thus be seen that the carriage return mentioned takes place only after the cycle has again been started to make a succeeding tabulation of the potentials associated with terminals 31 to 36, inclusive. As described, therefore, the tabulating device or typewriter 37 has printed the value of the potential associated with terminal 36, has made a normal space and then printed the potential associated with terminal 35. Afterwards a tabulation has been made giving a greater spacing and thereafter the potential associated with terminal 34 has been tabulated, followed by a normal space after which the potential associated with terminal 33 has been tabulated. After this point in the operation, a tabulation has been effected to provide a greater spacing of the recorded numbers and thereafter the potential associated with terminal 32 has been tabulated, followed by a space after which the potential associated with terminals 31 has been recorded or tabulated. The machine is now ready to repeat the investigation and tabulation of the potentials associated with terminals 31 to 36. Thus, in considering the operation of the device, in so far as has been described, it will be seen that repeated operations will result in repeated tabulations in three columns due to the action of the spacing and tabulating devices described. The effect of the switch associated with the minute hand of the clock 148 is to energize the motor circuit for a short period each time the minute hand reaches its upper position, that is, for a short period every hour on the hour. It will be seen that the closing of the switch 150 energizes the motor 117 and it will be remembered that the motor had previously stopped with rotating switch contact 130 on stationary switch contact point 136. Therefore, when the motor is started by clock 150 and the cams begin to rotate as described, the energization of solenoid 43 due to the action of cam 120 soon brings rotating switch contact 139 into position on stationary switch contact 131, thus locking the motor circuit so that the motor 117 remains energized in spite of the fact that the clock 148 shortly thereafter causes switch 150 to be opened.

As so far described, therefore, the device is one in which the potentials associated with terminals 31 to 36, inclusive, are investigated hourly and in which the resulting recording is made in three columns with a spacing in each of the columns to separate the figures. However, in many cases, such tests may run over long intervals of time and therefore it becomes desirable to provide additional breaks in the columns, and the clock of Fig. 2 is effective to provide such breaks on a twelve-hour basis. This operation is effected by providing an additional energization of the carriage return of the tabulating device 37 (Fig. 3) on a twelve-hour basis. Thus the switch 149, which is operated by the hour hand of the clock 148, effectively energizes the carriage return solenoid 114 (Fig. 3) an additional time at these twelve-hour intervals due to the action of cam 121.

A consideration of the device which has just been described will show that the design is very flexible and that the device can be adapted to meet a wide variety of conditions. Thus the device comprising toothed wheel 33 can be a standard notching relay which is commercially available or can be comprised of a combination of such relays so that almost any number of desired switch points can be obtained. Thus it is easily possible to record the potentials associated with, say, 100 pairs of terminals by a device in accordance with the invention. Also, it will be seen that, while a decade system providing a recording of two significant figures for each of the potentials which is investigated is illustrated in the device described, additional sections of potential dividers corresponding to those of 55 and 55' can be provided so that the potentials associated with the terminals to be investigated can be recorded to almost any accuracy required. It is, of course, readily apparent that, under some conditions, it may be desirable to eliminate potential divider 55' and thus provide an arrangement which operates on only one potential divider. It will furthermore be apparent that the principles of operation are not limited to a decade system of numbers and that any other number of voltage steps or positions may be provided in potential dividers 55 and 55'. As a matter of fact, in recent years binary systems have become increasingly important and it may be desirable in some cases to provide an arrangement in which each of the voltage dividers has only two positions. In general, however, this will result in the necessity of providing a very much increased number of voltage dividers corresponding to 55 and 55'. It will also be apparent from a consideration of the device described that it is possible to obtain a great deal of flexibility in the manner in which the data is presented by the recording device. Thus, in one particular device which has been used in a routine testing operation for some time, the potentials at one hundred different pairs of terminals is recorded and the device is caused to record the first five with proper spacings and thereafter to effect a tabulation. Correspondingly the next five potentials are recorded and followed by a tabulation. The same is true for the third, fourth, and fifth series of five. Thereafter, the machine is caused to have the carriage-return solenoid operated so that the ultimate tabulation with respect to the potentials associated with the one hundred terminals involved is in a series of five blocks, each block having 25 potentials recorded therein. It will be readily understood from the description given above how this or similar variations of the tabulations providing rows and columns can be obtained by means of suitable changes in the cams and switches shown. It will also be understood that the tabulating device 37 can be of a type adapted to punch holes in cards or in a tape such as is used in sending teletype signals rather than to provide an actual printing of the number involved. The provisions of punched cards has, in some cases, an advantage because they can be utilized to operate various business machines.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A device for periodically tabulating electrical potentials associated with a plurality of pairs of electrical terminals comprising: a tabulating device; means for successively effectively connecting said tabulating device to said pairs of electrical terminals to tabulate the individual potential associated with each particular pair of electrical terminals during the interval said tabulating device is connected thereto; a source of reference potential; a step-switch device having a first decade section for successively selecting progressively changing portions of said reference potential, during the interval said tabulating device is effectively connected to each of said pairs of terminals, in a series of relatively large equal steps taken in a single progressive stepping sequence through said first decade section and adapted to cover a predetermined range of potentials to be tabulated; means for comparing each said selected portion of said reference potential with the potential associated with the pair of said terminals to which said tabulating device is effectively connected; means responsive to said comparing means for developing a control signal when said reference portion selected by said first decade section of said step-switch device and said potential associated with the one of said pairs of terminals to which said tabulating device is effectively connected are related within predetermined limits; means dependent upon the timing of said control signal for causing said tabulating device to record an indication of the first significant figure of said potential associated with the pair of said terminals to which said tabulating device is effectively connected and which indication corresponds to one unit less than the setting associated with said step-switch when said control signal is developed; a second decade section in said step-switch device for successively selecting progressively changing portions of said reference potential adapted, in a series of potential steps individually one tenth as large as each of said first-mentioned series of potential steps and taken consecutively thereafter in a single progressive stepping sequence through said second decade section, to cover the larger potential step represented by the portion of said reference potential which had been selected by said first section at the time said responsive means developed said control signal; means for comparing the potential associated with said pair of terminals to which said tabulating device is effectively connected with the potential actually recorded by the action of the first decade section and to which is added the various potential steps selected by said second decade section of said step-switch device; means responsive to said last-named comparing means for developing a control signal when said compared voltages are related within predetermined limits; and means dependent upon the timing of said last-named control signal for causing said tabulating device to record an indication of the second significant figure of the potential associated with the pair of said terminals to which said tabulating device is effectively connected.

2. A device for periodically tabulating electrical potentials associated with a plurality of pairs of electrical terminals comprising: a tabulating device; means for successively effectively connecting said tabulating device to said pairs of electrical terminals to tabulate the individual potential associated with each particular pair of electrical terminals during the interval said tabulating device is connected to each of said pairs of terminals; a source of reference potential; a step-switch device for successively selecting progressively changing portions of said reference potential during the interval said tabulating device is effectively connected to each of said pairs of terminals; a comparing means; a switch for rapidly and repeatedly connecting said comparing means alternately to said selected pair of terminals and to each said selected portion of said reference potential during the interval said tabulating device is effectively connected with each of said pairs of terminals; a gas-filled tube in said comparing device which has an anode voltage which prevents conduction during one of said alternate connections and which allows conduction during the other of said alternate connections; a condenser in said comparing means adapted to have its charge changed by the potential associated with the one of said terminals to which said switch is connected and by the portion of said reference potential to which said switch is connected; means dependent upon the charge of said condenser for causing said gas-filled tube to become conductive to develop a control signal when said selected portion of said reference potential and said potential associated with the one of said pairs of terminals to which said tabulating device is effectively connected are related within predetermined limits; and means dependent upon the timing of said control signal for causing said tabulating device to record an indication of the potential associated with the pair of said terminals to which said tabulating device is effectively connected.

3. A device for periodically tabulating electrical potentials associated with a plurality of pairs of electrical terminals comprising: a tabulating device; means for successively effectively connecting said tabulating device to said pairs of electrical terminals to tabulate the individual potential associated with each particular pair of electrical terminals during the interval said tabulating device is connected to each of said pairs of terminals; a source of reference potential; a step-switch device for successively selecting progressively changing portions of said reference potential during the interval said tabulating device is effectively connected to each of said pairs of terminals; a comparing means; a switch for rapidly and repeatedly connecting said comparing means to said selected pair of terminals each said selected portion of said reference potential during the interval said tabulating device is effectively connected with each of said pairs of terminals; a gas-filled tube in said comparing device which has an anode voltage which prevents conduction during the interval said switching means is connected to any of said pairs of terminals but which has an anode potential which allows conduction during the interval said switch means is connected to said source of reference potential; a condenser in said comparing means adapted to have its charge changed by the potential associated with the one of said terminals to which said switch is connected and by the portion of said reference potential to which said switch is connected; means dependent upon the charge of said condenser for causing said gas-filled tube to become conductive to develop a control signal when said selected portion of said reference potential and said potential associated with the one of said pairs of terminals to which said tabulating device is effectively connected are related within predetermined limits; and means dependent upon the timing of said control signal for causing said tabulating device to record an indication of the potential associated with the pair of said terminals to which said tabulating device is effectively connected.

4. A device for periodically tabulating electrical potentials associated with a plurality of pairs of electrical terminals, comprising: a tabulating device; means for successively effectively connecting said tabulating device to said pairs of electrical terminals to tabulate the individual potential associated with each particular pair of electrical terminals during the interval said tabulating device is connected thereto; a source of reference potential; a step-switch device having a plurality of sections, each of which has a number of positions corresponding to the system of numbers adopted for purposes of measurement and recording while the number of such sections in said step-switch device corresponds to the number of significant figures in said system of numbers giving a desired degree of accuracy, for successively selecting progressively changing portions of said reference potential in a series of potential steps taken in a single progressive stepping sequence through each of said sections consecutively during the interval said tabulating device is effectively connected to each of said pairs of terminals, the steps in said stepping sequence available in each succeeding one of said sections being individually small enough that said last-mentioned stepping sequence substantially covers any single chosen one of the steps covered by the stepping sequence of the preceding one of said sections; means for comparing each said selected portion of said reference potential with the potential associated with the pair of said terminals to which said tabulating device is effectively connected; means responsive to said comparing means for developing a control signal when a portion of said reference potential selected by each section of said step-switch device and said potential associated with the one of said pairs of terminals to which said tabulating device is effectively connected are related within predetermined limits; means associated with said step-switch device and responsive to said control signal developed during selection of said changing portions of said reference potential in each one of said sections of said step-switch device except the last section thereof to add, to the incremental steps of said reference potential selected in the next succeeding section thereof, a potential corresponding to the potential selected when said last-mentioned control signal is developed; and means, dependent upon the timing of all of said control signals developed individually during selection of said changing portions of said reference potential in each one of said sections of said step-switch device, for causing said tabulating device to record in succession an indication of the significant figures, corresponding in number to the number of sections in said step-switch device, representing said potential associated with the pair of said terminals to which said tabulating device is effectively connected.

5. A device for periodically tabulating unidirectional electrical potentials associated with a plurality of pairs of electrical terminals, comprising: a tabulating device; terminal-selecting means for successively effectively connecting said tabulating device to said pairs of electrical treminals to tabulate the individual unidirectional potential associated with each particular pair of electrical terminals during the interval said tabulating device is connected thereto; means for providing a series of progressively changing unidirectional reference potentials of the same polarity as said first-mentioned unidirectional potentials during the interval said tabulating device is effectively connected to each of said pairs of terminals; a storage capacitor; an impedance in circuit with said storage capacitor; a two-position switch for rapidly and repeatedly connecting said storage capacitor, and said impedance in circuit therewith, alternately to said pair of terminals selected by said terminal-selecting means and to said progressively changing reference potentials during each of said intervals in which said tabulating device is effectively connected with corresponding particular pairs of said terminals to permit currents to flow through said impedance for adjusting the charge on said storage capacitor in conformity with the potential applied thereto from said selected pair of terminals and from said means for providing changing reference potentials at the alternate positions of said switch; means coupled to said impedance, and responsive to a signal of only one predetermined polarity developed therein when said switch is in only a predetermined one of its two positions, for developing a control signal when the value of said progressively changing reference potential has traversed the value of said potential associated with the one of said pairs of terminals to which said tabulating device is effectively connected; and means dependent upon the timing of said control signal for causing said tabulating device to record an indication of said potential associated with the pair of terminals to which said tabulating devce is effectvely connected.

6. A device for periodically tabulating electrical potentials associated with a plurality of pairs of electrical terminals, comprising: a tabulating device; means for successively effectively connecting said tabulating device to said pairs of electrical terminals to tabulate the individual potential associated with each particular pair of electrical terminals during the interval said tabulating device is connected thereto; a source of reference potential; a step-switch device having a plurality of potential-selecting sections, for sequential operation during the interval said tabulating device is effectively connected to each of said pairs of terminals, adapted to select progressively changing portions of said reference potential covering, in a series of relatively large potential steps taken in a single progressive stepping sequence through one of said plurality of sections, a predetermined range of potentials to be tabulated, and covering consecutively thereafter, in a series of smaller steps taken in a single progressive stepping sequence through another section of said step-switch device, substantially all of the larger potential step represented by any single chosen one of the portions of said reference potential selected in said one section; means for comparing each said selected portion of said reference potential with the potential associated with the pair of said terminals to which said tabulating device is effectively connected; means responsive to said comparing means for developing a control signal when said portion of said reference potential selected by each section of said step-switch device and said potential associated with the one of said pairs of terminals to which said tabulating device is effectively connected are related within predetermined limits; and means, dependent upon the timing of said control signals, for choosing said one single portion of said reference potential, selected by said one section of said step-switch device, which is to be made available for covering subsequently in said series of smaller steps by said portions of said reference potential selected in said other section of said step-switch device, and for causing said tabulating device to record an indication of said potential associated with the pair of said terminals to which said tabulating device is effectively connected to a number of significant places corresponding to the number of said sequentially operative sections in said step-switch device.

7. A device for periodically tabulating electrical potentials associated with a plurality of pairs of electrical terminals, comprising: a tabulating device; means for successively effectively connecting said tabulating device to said pairs of electrical terminals to tabulate the individual potential associated with each particular pair of electrical terminals during the interval said tabulating device is connected thereto; a source of reference potential; a step-switch device having a plurality of potential-selecting decade sections, for sequential operation during the interval said tabulating device is effectively connected to each of said pairs of terminals, adapted to select progressively changing portions of said reference potential covering, in a series of relatively large potential steps taken in a single progressive stepping sequence through one of said plurality of sections, a predetermined range of potentials to be tabulated, and covering consecutively thereafter, in a series of smaller steps taken in a single progressive stepping sequence through another section of said step-switch device, substantially all of the larger potential step represented by any single chosen one of the portions of said reference potential selected in said one section; means for comparing each said selected portion of said reference potential with the potential associated with the pair of said terminals to which said tabulating device is effectively connected; means responsive to said comparing means for developing a control signal when said portion of said reference potential selected by each decade section of said step-switch device and said potential associated with the one of said pairs of terminals to which said tabulating device is effectively connected are related within predetermined limits; and means, dependent upon the timing of said control signals, for choosing said one single portion of said reference potential, selected by said one section of said step-switch device, which is to be made available for covering subsequently in said series of smaller steps by said portions of said reference potential selected in said other section of said step-switch device, and for causing said tabulating device to record an indication of said potential associated with the pair of said terminals to which said tabulating device is effectively connected to a number of significant places corresponding to the number of said sequentially operative decade sections in said step-switch device.

8. A device for periodically tabulating electrical potentials associated with a plurality of pairs of electrical terminals, comprising: a tabulating device; means for successively effectively connecting said tabulating device to said pairs of electrical terminals to tabulate the individual potential associated with each particular pair of electrical terminals during the interval said tabulating device is connected thereto; a source of reference potential; a step-switch device having two potential-selecting decade sections, for sequential operation during the interval said tabulating device is effectively connected to each of said pairs of terminals, adapted to select progressively changing portions of said reference potential covering, in a series of relatively large potential steps taken in a single progressive stepping sequence through one of said two sections, a predetermined range of potentials to be tabulated, and covering consecutively thereafter, in a series of smaller steps taken in a single progressive stepping sequence through the other of said two decade sections, substantially all of the larger potential step represented by any single chosen one of the portions of said reference potential selected in said one section; means for comparing each said selected portion of said reference potential with the potential associated with the pair of said terminals to which said tabulating device is effectively connected; means responsive to said comparing means for developing a control signal when said portion of said reference potential selected by each decade section of said step-switch device and said potential associated with the one of said pairs of terminals to which said tabulating device is effectively connected are related within predetermined limits; and means, dependent upon the timing of said control signals, for choosing said one single portion of said reference potential, selected by said one section of said step-switch device, which is to be made available for covering subsequently in said series of smaller steps by said portions of said reference potential selected in said other section of said step-switch device, and for causing said tabulating device to record to two significant places an indication of said potential associated with the pair of said terminals to which said tabulating device is effectively connected.

References Cited in the file of this patent

UNITED STATES PATENTS

| | | |
|---|---|---|
| 2,207,744 | Larson | July 16, 1940 |
| 2,313,752 | Le Clair | Mar. 16, 1943 |
| 2,444,202 | McAlpine | June 29, 1948 |
| 2,564,294 | Belcher | Aug. 14, 1951 |
| 2,629,842 | Berry | Feb. 24, 1953 |

FOREIGN PATENTS

| | | |
|---|---|---|
| 266,798 | Great Britain | Feb. 28, 1927 |